(No Model.) 4 Sheets—Sheet 1.

T. JENKINS & S. ILLIDGE.
RAILWAY FOG SIGNAL.

No. 548,061. Patented Oct. 15, 1895.

WITNESSES
Henry S Kerrett
Arthur T. Sadler

INVENTORS.
Thomas Jenkins
Samuel Illidge (No Model.) 4 Sheets—Sheet 2.
T. JENKINS & S. ILLIDGE.
RAILWAY FOG SIGNAL.
No. 548,061. Patented Oct. 15, 1895.
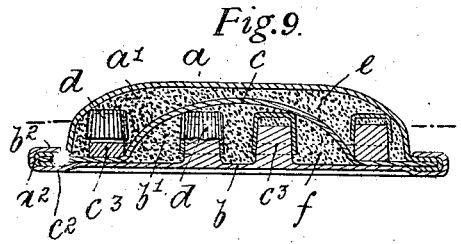
Fig. 9.
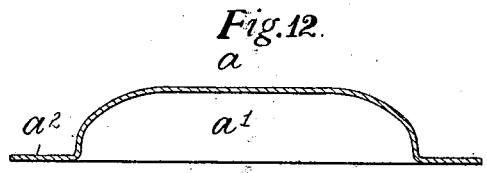
Fig. 12.
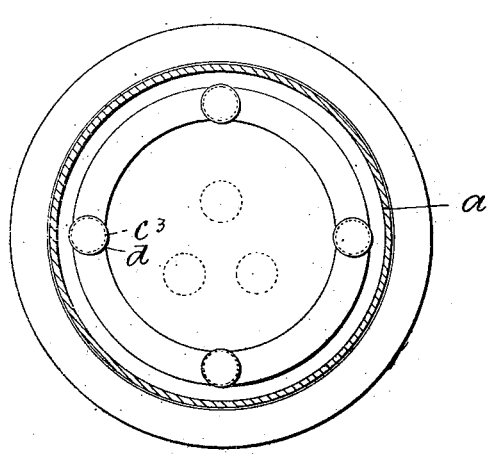
Fig. 10.
Fig. 11.
Fig. 13.
Fig. 14.
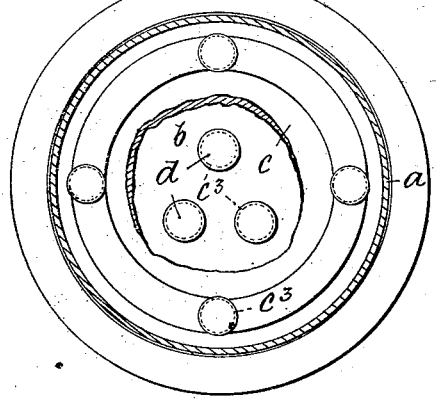
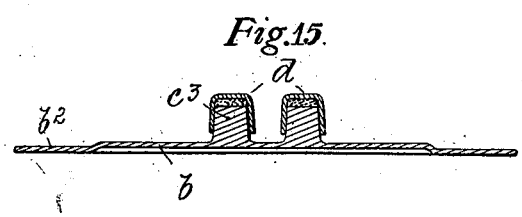
Fig. 15.
WITNESSES.
Henry S Kerrett
Arthur T. Sadler
INVENTORS.
Thomas Jenkins
Samuel Illidge (No Model.) 4 Sheets—Sheet 3.
T. JENKINS & S. ILLIDGE.
RAILWAY FOG SIGNAL.
No. 548,061. Patented Oct. 15, 1895.
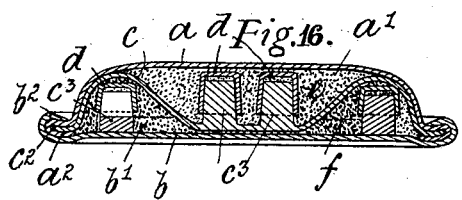
Fig. 16.
Fig. 17.
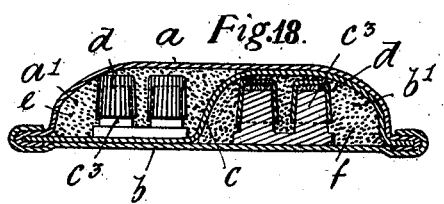
Fig. 18.
Fig. 19.
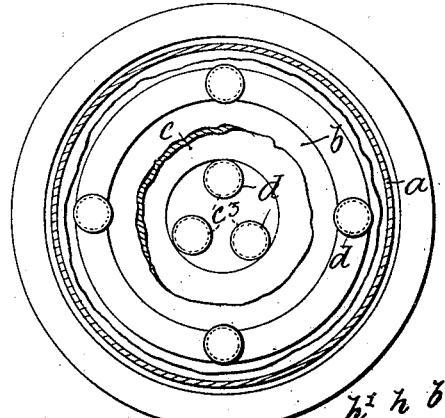
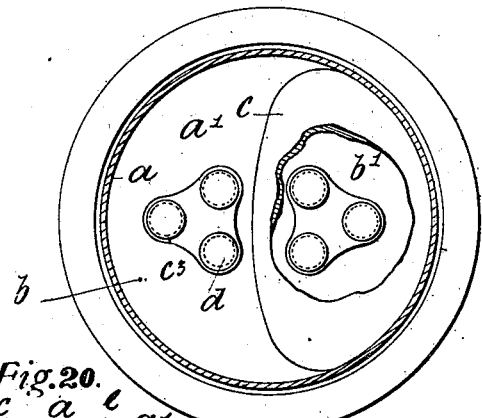
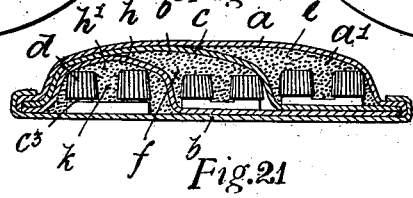
Fig. 20.
Fig. 21.
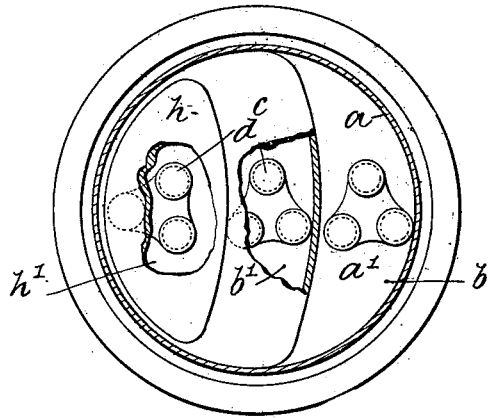
WITNESSES
Henry Skerrett
Arthur J. Sadler
INVENTORS
Thomas Jenkins
Samuel Illidge (No Model.) 4 Sheets—Sheet 4.

T. JENKINS & S. ILLIDGE.
RAILWAY FOG SIGNAL.

No. 548,061. Patented Oct. 15, 1895.

WITNESSES
Henry S. Barrett
Arthur J. Sadler

INVENTORS
Thomas Jenkins
Samuel Illidge

UNITED STATES PATENT OFFICE.

THOMAS JENKINS AND SAMUEL ILLIDGE, OF BIRMINGHAM, ENGLAND; SAID ILLIDGE ASSIGNOR TO SAID JENKINS.

RAILWAY FOG-SIGNAL.

SPECIFICATION forming part of Letters Patent No. 548,061, dated October 15, 1895.

Application filed June 22, 1895. Serial No. 553,711. (No model.) Patented in England January 24, 1894, No. 1,513; in France December 6, 1894, No. 243,431, and in Belgium December 6, 1894, No. 113,034.

*To all whom it may concern:*

Be it known that we, THOMAS JENKINS, manufacturer, residing at Moland Street, in the city of Birmingham, England, and SAMUEL ILLIDGE, foreman of works, residing at Belcher's Lane, Small Heath, near the city of Birmingham aforesaid, subjects of the Queen of Great Britain, have invented new and useful Improvements in Railway Fog-Signals, of which the following is a specification, and for which said invention we have obtained Letters Patent of Great Britain, dated the 24th day of January, 1894, and numbered 1,513; of France, dated the 6th day of December, 1894, No. 243,431, and of Belgium, dated the 6th day of December, 1894, No. 113,054.

This invention relates to improvements in railway fog-signals, and has for its object the minimizing of the possibility of misfires, and this we accomplish by making the said fog-signal double, triple, or quadruple chambered and providing each separate chamber with an independent explosive charge and detonating adjuncts.

Figure 1:
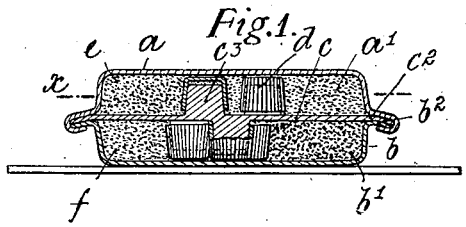
Figure 5:
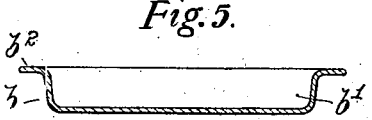
Figure 2:
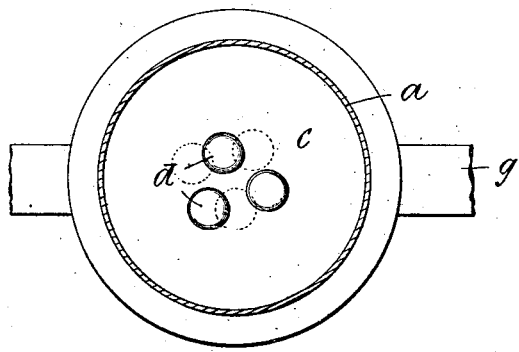
Figure 6:
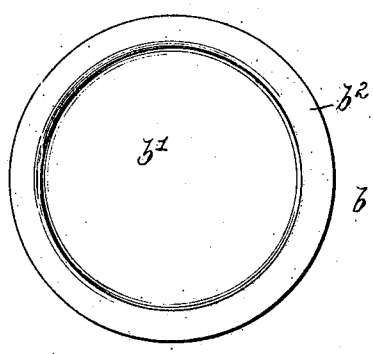
Figure 3:
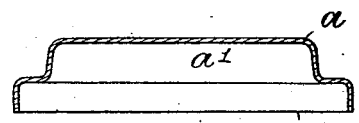
Figure 7:
Figure 4:
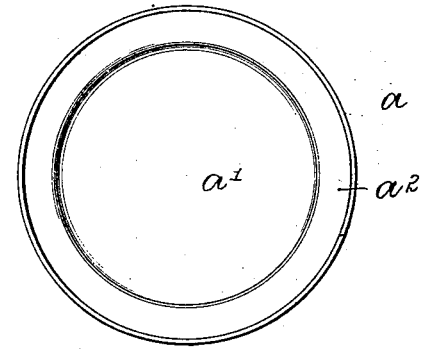
Figure 8:
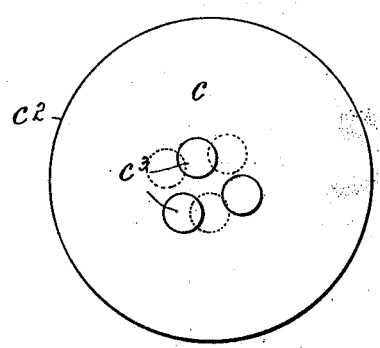

Figure 1 of the accompanying drawings represents a vertical section of a double-chambered fog-signal made in accordance with our invention. Fig. 2 represents a horizontal section of the same upon the dotted lines $x$, Fig. 1. Fig. 3 represents a section of the top shallow-cupped and flanged shell. Fig. 4 is an under side plan of the same. Fig. 5 is a section of the lower flanged and shallow-cupped shell, and Fig. 6 a top side plan view thereof, while Fig. 7 is a section of the divisional diaphragm or disk having either integral or attached detonating-nipples upon both sides, and Fig. 8 is a plan of the same. $a$ is the top shallow-cupped and flanged shell, consisting of a chambered body part $a'$ and a mouth $a^2$, the latter $a^2$ forming a doubling-over closing-flange, which is closed under a straight flange $b^2$ of the lower cupped shell $b$, the dished part $b'$ of which forms a second chamber to the signal, and the flange or boundary edge $c^2$ of a horizontal or middle divisional diaphragm or disk $c$, having upon teh two opposite sides of it solid or attached detonating-nipples $c^3$, fitted with detonating-caps $d$ (see Fig. 1,) located within the middle of powder charges $e$ and $f$, placed within the chambers $a'$ $b'$ of the single case or fog-signal, which may be provided with the usual soft-metal clip $g$ for its attachment to the metals of a permanent or other way.

Fig. 9 represents a modified form of signal which is divided off annularly into two chambers instead of horizontally, as in the previous arrangement. Fig. 10 is a horizontal section of the same upon the dotted lines A, looking downward. Fig. 11 is a like view to Fig. 10, but with the dome of the division-shell broken into, in order to show the under or bottom chamber with the nipples or detonating-caps. Figs. 12, 13, 14, and 15 represent the component parts of the signal separately. $a$ is the upper shell with a broad flange $a^2$ and an inside hollow or chamber part $a'$. $c^3$ are one set of nipples carried by a nipple-ring in the chamber $a'$, and $d$ are the fulminating-caps placed thereon. $c$ is a divisional diaphragm or disk, having a domed chamber formed within its middle. $b$ is the bottom shell or disk with boundary edges $b^2$ to close both over the outer edges $c^2$ of the divisional shell $c$ and also over the extreme outer and boundary edge $a^2$ of the shell $a$, so as to give the case a double-closed edge and form a preventive against the incursion of damp and wet to the powder charges $e$ and $f$. This shell or plate $b$ also has attached or integral lower nipples $c^3$, located within the chamber $b'$ and upon which nipples fulminate caps $d$ are placed.

Fig. 16 represents in vertical section a like duplex fog-signal, but with the middle diaphragm differently shaped. Fig. 17 is a top side plan of the same, with the middle portions of the upper and middle shells and also the powder removed, so as to exhibit the nipples carrying the detonating-cap. $a$ is the top shell. $b$ is an under or lower shell, and $c$ is a divisional or middle shell with an inverted dome or well within its middle, thus making between the upper and lower shells two compartments $a'$ and $b'$, which are filled with powder or other explosive charges $e$ and $f$ and have nipples $c^3$, fitted with fulminating-caps $d$. Thus the lower chamber is of the shape of an annulus while the top chamber is like unto a well, and the boundary edge $a^2$ of the top shell is turned under the boundary edge $c^2$ of the divisional shell $c$, and then the boundary edge $b^2$ of the lower shell $b$ is turned over the combined edges, thus forming a double-closed edge, with the nipple-ring with nipples and caps coming between the component shells $b$ and $c$.

Fig. 18 represents a like fog-signal, in which the primary casing is separated or divided off into two compartments by the vertical walls of middle disk or shell. Fig. 19 represents a horizontal section of Fig. 18, with the walls of the lower compartment broken into and with the powder charges removed, so as to show the detonating-nipples in both of them. $a$ is the outer top shell, and $b$ is the bottom shell, the former $a$ being made like unto an inverted shallow dish or cup and the latter being made plate form and to constitute a base, and between these components comes a middle divisional shell $c$, having an eccentrically-located dome formed within it, the whole of the parts being united by turning over the edges, as before represented in Figs. 16 and 17, thereby forming a duplex-chambered signal with the chambers $a'$ $b'$, filled with powder charges $e$ and $f$ and being provided with detonating adjuncts $c^3$, fitted with fulminate caps $d$.

Fig. 20 represents a triple-chambered fog-signal, being made up of four shells, with the boundary edges of the component parts turned over, forming a treble-closed joint. Fig. 21 represents a part horizontal section of Fig. 20. $a$ is the top shell, and $b$ is the lower shell or disk, with intervening inner shells $c$ and $h$ coming between them, and each having eccentric domes with each of the three separate chambers $a'$, $b'$, and $h'$, being separately charged with explosive $e$, $f$, and $k$, each having detonating adjuncts $c^3$, fitted with fulminate caps $d$. It will be seen that the dome parts forming the chambers are eccentric and lie inverted cupwise one within another.

Figure 22:
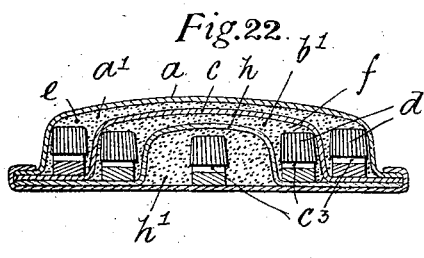

Fig. 22 represents a section of a railway fog-signal, having three concentric and annularly-arranged compartments like unto the arrangement before described. $a$ is a top and inverted-dish-shaped shell, and $c$ and $h$ are like inner ones, concentrically located one within the other, forming with a lower or base shell or plate $b$ annular chambers $a'$ $b'$ $h'$, each having powder charges $e$, $f$, and $k$, and being fitted with detonating adjuncts $c^3$ and caps $d$, and with the boundary edges of the said disks being closed in the same way as in the preceding forms of our invention.

Figure 23:
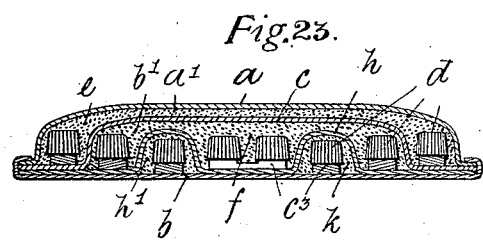

Fig. 23 represents a vertical section of another triple-chambered fog-signal like unto Fig. 22 and the preceding figures. $a$ is the top and inverted cupped shell, $c$ is an inner one, $b$ is a base or lower one, and $h$ is an intermediate shell coming between the base $b$ and the inner shell $c$, which is inverted, cupped, or domed, while the said shell $h$ is formed with an annular chamber by a well in the middle.

When placed together the said shells form chambers $a'$ $b'$ $h'$, and are united together by turning over the metal at their boundary edges, as in the preceding arrangements.

Figure 24:
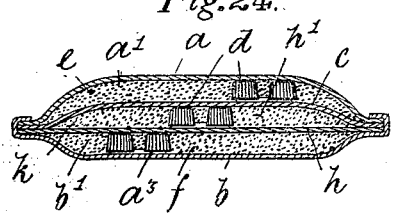

Fig. 24 represent a further modification of triple or multiple horizontal chambered case made according to our invention. $a$ is the top shell and $b$ is the bottom one, while $c$ and $h$ are intermediate disks or diaphragms coming between them, with the boundary edges of the three upper shells being closed by the boundary edges of the lower shell being turned over those of the others. $a'$ $b'$ $h'$ are three horizontal and separate chambers filled with powder charges $e$, $f$, and $k$, and being independently fitted with detonating expedients $a^3$, provided with fulminating-caps $d$.

Figure 25:
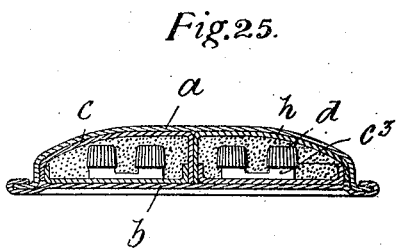
Figure 26:
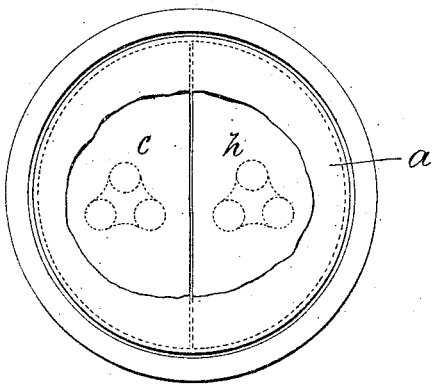

Fig. 25 represents a vertical section of another form of multiple or double signal. Fig. 26 represents a top side plan of the same with a portion of the crown-shell broken into for the purpose of showing the tops of the half-casings, which are respectively semicircular and preferably of a box construction. $a$ is the outer or crown shell and $b$ is the bottom shell, with the boundary edges of the one shell turned and closed over the boundary edges of the other, between which upper and lower shells, which together form the primary casing of the signal, two other charged box-casings $c$ and $h$, each fitted with detonating adjuncts $c^3$ $d$, are inclosed.

Figure 27:
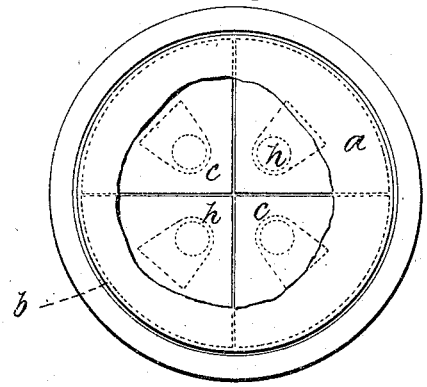

Although we have represented that the inside and separate charged cases $c$ and $h$ are made of a box figure, yet, if necessary, the same may be with flanged edges, and they may be three or four in number, as represented in position in Fig. 27. $a$ is the top shell, $b$ is the bottom one, and $c$ and $h$ are four independent box-casings located between the shells, whose edges are closed together, hence a quadruple signal.

Having fully described our invention, what we desire to claim and secure by Letters Patent is—

1. In a railway torpedo, the combination with the upper and lower flanged shells or plates, one of which is bent over upon the other to secure the parts together, of a diaphragm or disk secured between said plates and dividing the space intermediate the latter into two or more compartments each of which is filled with explosive material, a plurality of solid nipples carried by the diaphragm and arranged within the various compartments, and a percussion cap seated upon each nipple, substantially as described.

2. In a railway torpedo, the combination with the upper and lower flanged plates or shells one of which is bent over upon the other to secure the parts together, of a diaphragm secured between the edges of said flanged plates and dividing the space between the two plates into two compartments one located above the other, an explosive compound filling each compartment, a plurality of solid nipples carried by the diaphragm and distributed through the said compartments within the body of explosive material, and a percussion cap seated upon each nipple, substantially as described.

3. In a detonating signal the combination with a suitable casing divided into two or more compartments each of which is filled with an explosive compound, of a series of solid nipples arranged within said compartments and surrounded by the explosive compound, and a percussion cap seated upon each nipple, substantially as described.

In testimony whereof we have hereunto set our hands and affixed our seals in presence of two subscribing witnesses.

THOMAS JENKINS. [L. S.]
SAMUEL ILLIDGE. [L. S.]

Witnesses:
HENRY SKERRETT,
ARTHUR T. SADLER.